T. D. THOMAS.
BOLT.
APPLICATION FILED FEB. 19, 1921.

1,400,248.

Patented Dec. 13, 1921.

INVENTOR.
Thomas D. Thomas
BY W. C. Carman
ATTORNEY

UNITED STATES PATENT OFFICE.

THOMAS D. THOMAS, OF YOUNGSTOWN, OHIO, ASSIGNOR OF ONE-THIRD TO WALTER D. McKAY AND ONE-THIRD TO THOMAS L. THOMAS.

BOLT.

1,400,248.  Specification of Letters Patent.  Patented Dec. 13, 1921.

Application filed February 19, 1921. Serial No. 446,411.

*To all whom it may concern:*

Be it known that I, THOMAS D. THOMAS, citizen of the United States, residing at Youngstown, in the county of Mahoning and State of Ohio, have invented certain new and useful Improvement in Bolts, of which the following is a specification.

This invention relates to bolts, pins and similar fastening devices, the object being to provide an automatic locking bolt or fastening.

To accomplish this, I form my bolt in two parts, one of which I have designated as the "main" part, and the other as the "key" or "locking" part.

Figure 1:
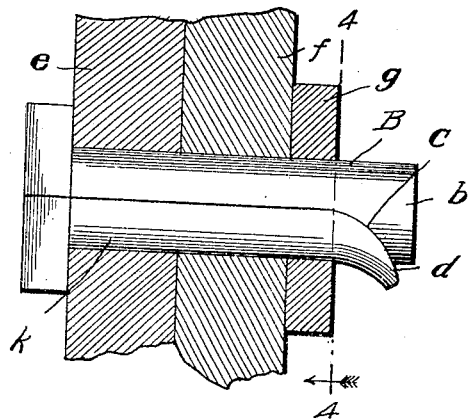
Figure 1 is a view, partially in section, showing the application of my invention in actual use.

B represents the main part of my bolt, the shank or stem of which is substantially of semi-circular formation in cross-section (as shown in the drawings,) as at $a$, except that adjacent its inner end it is gradually enlarged into substantially circular formation, as at $b$, thus forming an inwardly curved or concave section $c$.

K represents the key or locking part of my bolt, and is similar in formation to the main part B, except that at its inner end, instead of being enlarged into circular formation, it is gradually cut away or tapered, thus forming an outwardly curved or convex section $d$.

The operation of my device is obvious.

After passing the main part B of the bolt through the objects which are to be fastened together, indicated by $e$ and $f$, and through the shoring $g$ of the proper thickness, the locking part K of the bolt is inserted, with its flat face or surface adjacent the similar surface of the main part, and when the inner point $d$ of the locking part strikes the beginning of the concave section $c$ on the main part, this inner point will be forced gradually outward beyond the longitudinal plane of the circumference of the bolt, thus locking and securing the two or more objects $e$ and $f$ firmly together, as plainly shown in Fig. 1.

Figure 3:
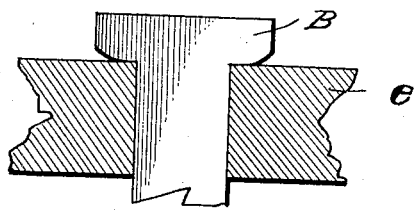
Fig. 3 is a fragmentary view, partially in section, showing the inner face of the head of the bolt as being slightly beveled or oval, to permit the insertion of a tool for extracting purposes.
Figure 4:
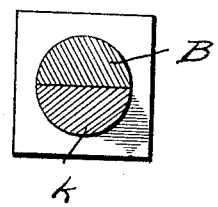
Fig. 4 is an end view, partially in section, drawn on line 4—4, Fig. 1.

If desired, the inner face of the bolt head may be slightly cut away, as shown in Fig. 3, for the purpose of inserting a tool to extract the bolt.

Figure 5:
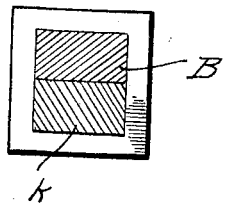
Fig. 5 is a view similar to Fig. 4, but illustrating the bolt as being angular in cross-section instead of circular, as otherwise illustrated and described.

While I have illustrated and described my bolt or pin as being circular in cross-section, it is, of course, obvious that it will be equally practical to make it angular in cross-section, as shown in Fig. 5.

Figure 6:
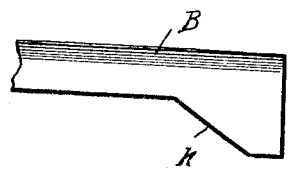
Fig. 6 shows a slight modification or variation in the outline of the main part of my bolt.
Figure 2:
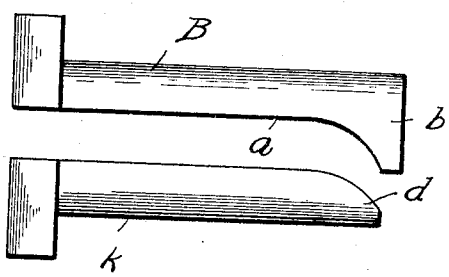
Fig. 2 illustrates the two parts of my bolt in juxtaposition, but not assembled in operative relation.

Also, instead of the inwardly curved or concave section $o$, this section may occupy a straight inclined plane, as shown at $h$, Fig. 6.

I claim:—

1. A bolt or pin formed in two parts, the shank or stem of one part being substantially semi-circular in cross-section, except that its inner end is enlarged into substantially circular formation, the enlarged portion curving inwardly and merging into the flat face of the semi-circular portion of the shank; the other part being of similar formation, except that its inner end is curved or tapered from its flat surface outwardly toward its oval surface.

2. A bolt or pin formed in two parts, the shank or stem of one part being substantially semi-circular in cross-section, except that its inner end is gradually enlarged outwardly, from its flat surface, forming an inwardly curved or concave section; the other part being of similar formation, except that its inner end is curved outwardly, or cut away, forming an outwardly curved or convex section.

3. A bolt or pin formed in two parts, the shank or stem of one part being less than a complete circle in cross-section, except that its inner end is enlarged into substantially circular formation, the enlarged portion curving inwardly and merging into the flat face of the smaller portion; the other part being of proper size and shape in cross-section to form a body substantially circular in cross-section when joined with the first described part, except that its inner end is curved or tapered from its flat surface outwardly toward its oval surface.

4. A bolt or pin formed in two parts, the shank or stem of one part being less than a complete circle in cross-section, and adjacent its inner end being gradually enlarged outwardly from its flat surface, forming an inwardly curved or concave section; the other part being of proper size and shape in cross-section to form a body substantially circular in cross-section when joined with the first described part, except that its inner end is curved outwardly, or cut away, forming an outwardly curved or convex section.

In testimony whereof I hereunto affix my signature in the presence of two witnesses.

THOMAS D. THOMAS.

Witnesses:
ALICE McGINN,
CLARA HINDSON.